(12) United States Patent  
Honjo

(10) Patent No.: US 10,873,784 B2  
(45) Date of Patent: Dec. 22, 2020

(54) COMMUNICATION APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Wataru Honjo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/244,403

(22) Filed: Jan. 10, 2019

(65) Prior Publication Data

US 2019/0230413 A1    Jul. 25, 2019

(30) Foreign Application Priority Data

Jan. 22, 2018 (JP) ................. 2018-008167

(51) Int. Cl.
  *H04N 7/173* (2011.01)
  *H04N 21/462* (2011.01)
  (Continued)

(52) U.S. Cl.
  CPC ......... *H04N 21/4622* (2013.01); *H04L 67/16* (2013.01); *H04N 5/2254* (2013.01);
  (Continued)

(58) Field of Classification Search
  CPC ......... H04N 21/4622; H04N 21/44245; H04N 21/6543; H04N 21/4223
  (Continued)

(56) References Cited

U.S. PATENT DOCUMENTS 7,170,857 B2 *   1/2007   Stephens ................. H04L 67/28
                                                              370/230
7,908,628 B2 *   3/2011   Swart ................. H04N 7/17318
                                                              725/93

(Continued)

FOREIGN PATENT DOCUMENTS

CN         102404733 A      4/2012
CN         102665070 A      9/2012
               (Continued)

OTHER PUBLICATIONS

European Search Report dated Jun. 13, 2019, in related European Patent Application No. 18248135.8.

(Continued)

*Primary Examiner* — Michael B. Pierorazio  
(74) *Attorney, Agent, or Firm* — Venable LLP

(57) ABSTRACT

A communication apparatus determines, in a case where connection with an external apparatus is disconnected, whether the disconnection is performed by the external apparatus. In a case where reconnection to a network is performed after connection to the external apparatus is disconnected and it is determined that the disconnection is not performed by the external apparatus, a communication unit is controlled to maintain a limitation for communication with another external apparatus and to transmit a reconnection notification to the external apparatus by unicast. In a case where reconnection to the network is performed after connection to the external apparatus is disconnected and it is determined that the disconnection is performed by the external apparatus, the communication unit is controlled to communicate with the other external apparatus without the limitation.

15 Claims, 5 Drawing Sheets

(51) Int. Cl.

| | | |
|---|---|---|
| H04N 5/225 | (2006.01) | |
| H04N 5/3745 | (2011.01) | |
| H04N 21/442 | (2011.01) | |
| H04N 21/6543 | (2011.01) | |
| H04W 76/19 | (2018.01) | |
| H04N 21/4223 | (2011.01) | |
| H04W 8/00 | (2009.01) | |
| H04L 29/08 | (2006.01) | |
| H04N 21/47 | (2011.01) | |
| H04N 21/478 | (2011.01) | |

(52) U.S. Cl.
CPC ..... *H04N 5/37452* (2013.01); *H04N 21/4223* (2013.01); *H04N 21/44245* (2013.01); *H04N 21/47* (2013.01); *H04N 21/6543* (2013.01); *H04W 8/005* (2013.01); *H04W 76/19* (2018.02); *H04N 21/478* (2013.01)

(58) Field of Classification Search
USPC .......................................................... 725/133
See application file for complete search history.

(56) References Cited

U.S. PATENT DOCUMENTS

| | | | | |
|---|---|---|---|---|
| 8,385,345 | B2 * | 2/2013 | Ji | H04L 45/128 370/394 |
| 8,467,770 | B1 | 6/2013 | Ayed | |
| 8,484,676 | B1 * | 7/2013 | Narsimhan | H04N 21/4126 348/734 |
| 9,344,687 | B2 | 5/2016 | Kozakura | |
| 9,538,413 | B2 * | 1/2017 | Chou | H04L 41/0836 |
| 9,713,073 | B2 * | 7/2017 | Sirotkin | H04W 56/001 |
| 10,021,622 | B2 | 7/2018 | Goto | |
| 10,055,956 | B2 | 8/2018 | Kozakura | |
| 2002/0162120 | A1 * | 10/2002 | Mitchell | H04N 7/165 725/135 |
| 2003/0229900 | A1 * | 12/2003 | Reisman | G06F 16/954 725/87 |
| 2004/0148326 | A1 | 7/2004 | Nadgir et al. | |
| 2005/0028195 | A1 * | 2/2005 | Feinleib | H04N 7/163 725/32 |
| 2005/0083973 | A1 * | 4/2005 | Krishnan | H04J 3/1682 370/468 |
| 2008/0155622 | A1 * | 6/2008 | Chami | H04N 7/17318 725/105 |
| 2010/0037258 | A1 * | 2/2010 | Chitturi | H04N 21/234318 725/39 |
| 2010/0299702 | A1 * | 11/2010 | Lo | G06Q 20/123 725/39 |
| 2011/0302611 | A1 * | 12/2011 | Eyer | H04N 21/47217 725/46 |
| 2011/0307920 | A1 * | 12/2011 | Blanchard | H04N 21/4431 725/32 |
| 2012/0047531 | A1 * | 2/2012 | Eyer | H04N 21/654 725/37 |
| 2012/0066134 | A1 | 3/2012 | Washiro | |
| 2012/0324504 | A1 * | 12/2012 | Archer | H04N 21/4532 725/30 |
| 2013/0074141 | A1 * | 3/2013 | Hwang | H04N 21/8126 725/116 |
| 2013/0347026 | A1 * | 12/2013 | Reisman | G11B 27/034 725/25 |
| 2013/0347038 | A1 * | 12/2013 | Lee | H04N 21/4312 725/40 |
| 2014/0068686 | A1 * | 3/2014 | Oh | H04N 21/4532 725/93 |
| 2014/0380388 | A1 * | 12/2014 | Lee | H04N 21/858 725/110 |
| 2017/0155832 | A1 | 6/2017 | Oshima et al. | |
| 2018/0007215 | A1 | 1/2018 | Zakharov | |

FOREIGN PATENT DOCUMENTS

| | | |
|---|---|---|
| CN | 104980697 A | 10/2015 |
| CN | 204990032 U | 1/2016 |
| CN | 105391983 A | 3/2016 |
| CN | 106341459 A | 1/2017 |
| JP | 2014-216911 A | 11/2014 |

OTHER PUBLICATIONS

Chinese Office Action dated Sep. 1, 2020, in related Chinese Patent Application No. 201910053855.3 (with English translation).

* cited by examiner

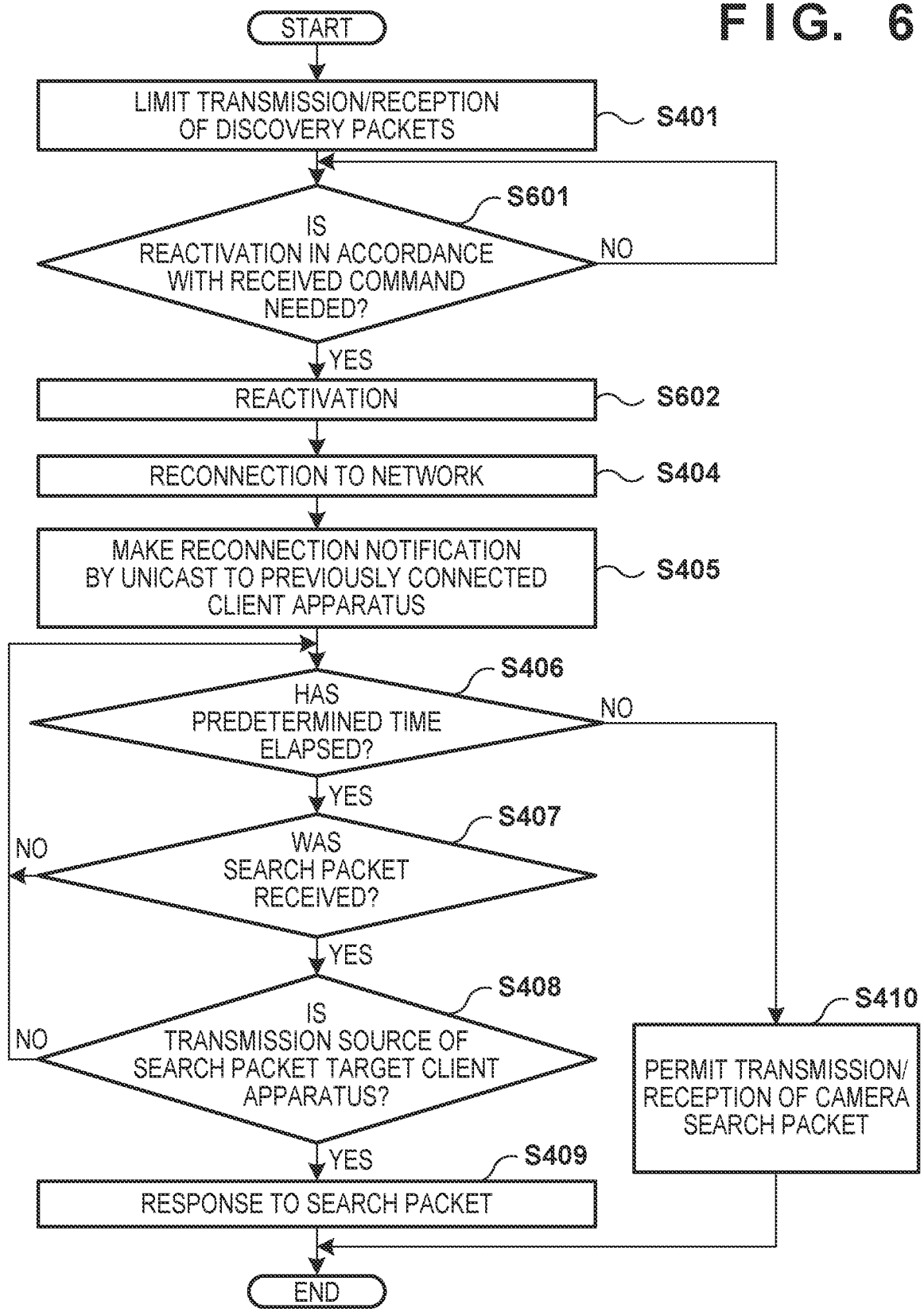

COMMUNICATION APPARATUS, IMAGE CAPTURING APPARATUS, CONTROL METHOD, AND STORAGE MEDIUM

BACKGROUND OF THE INVENTION

Field of the Invention

The present invention relates to processing at the time of reconnection after network connection is disconnected.

Description of the Related Art

In a system using a monitoring camera, a client that, for example, acquires a video of the camera and operates the camera generally establishes connection to the camera on a network using a discovery protocol. The discovery protocol includes, for example, WS-Discovery (Web Service Dynamic Discovery). In the discovery protocol, a service providing side apparatus (camera) transmits a packet for making a notification that the apparatus is connected to the network. In addition, a service receiving side apparatus (client) transmits a search packet to search for a device existing on the network, and the service providing side apparatus transmits a response to the search packet.

The camera (service providing side apparatus) that has established connection to the client can stop discovery packet transmission/reception so as not to, for example, respond to a search from another client (see Japanese Patent Laid-Open No. 2014-216911). For example, in ONVIF (Open Network Video Interface Forum) as a common standard for connection between a network camera and a client, a mode that limits discovery packet transmission/reception is defined. This mode is called a non-discoverable mode. An apparatus that currently operates in this mode does not make a notification that the apparatus is connected to the network or respond to a search packet. The client can send a mode change request to a camera that supports this mode to stop discovery packet transmission/reception by the camera.

If connection between the camera and the network is disconnected and reconnection is then performed in a state in which a discovery packet is stopped, the camera may not be able to make a notification of the existence of the side apparatus or respond to a search packet from the client. Consequently, the client may not be able to confirm whether the camera exists on the network, thereby making it impossible to resume communication between the client and the camera.

SUMMARY OF THE INVENTION

The present invention provides a technique of resuming communication appropriately when one of two or more apparatuses connected via a network is disconnected from the network unintentionally and is then reconnected.

According to one aspect of the present invention, there is provided a communication apparatus comprising: a communication unit capable of executing, while the communication apparatus is connected to a network, communication for allowing another apparatus connected to the network to recognize the communication apparatus; and a control unit configured to control the communication unit to limit the communication, wherein the control unit controls the communication unit to maintain the limitation when reconnection to the network is performed after connection to a communication partner apparatus via the network is disconnected regardless of control by the communication partner apparatus while the limitation is imposed.

According to another aspect of the present invention, there is provided an image capturing apparatus comprising: an image capturing unit configured to capture an image; a communication unit capable of executing, while the image capturing apparatus is connected to a network, communication for allowing another apparatus connected to the network to recognize the image capturing apparatus and communication for transmitting the image to a communication partner apparatus; and a control unit configured to control the communication unit to limit the communication, wherein the control unit controls the communication unit to maintain the limitation when reconnection to the network is performed after connection to the communication partner apparatus via the network is disconnected regardless of control by the communication partner apparatus while the limitation is imposed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a flowchart illustrating the second example of the procedure of the processing executed by the camera.

DESCRIPTION OF THE EMBODIMENTS

Figure 1:
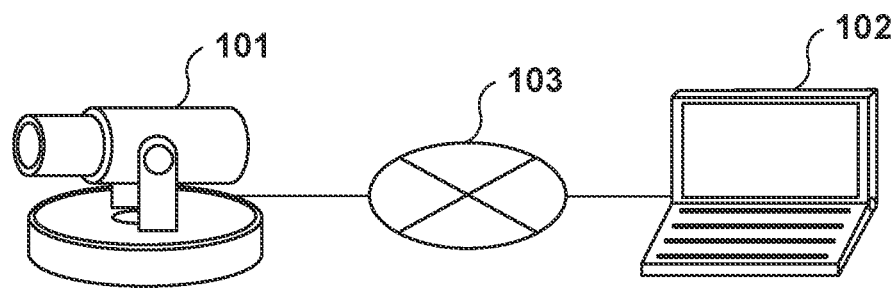
FIG. 1 is a view showing an example of a system arrangement.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

This embodiment assumes an environment in which the first apparatus that receives a provided service discovers, based on a predetermined service discovery protocol, the second apparatus that provides the service via a network. At this time, the second apparatus prevents itself from being discovered by another apparatus different from the first apparatus. For example, as described above, the second apparatus operates in the non-discoverable mode defined by the ONVIF standard (by an instruction from the first apparatus or the like). This prevents the second apparatus from making a notification that the side apparatus is connected to the network or responding to a search signal from another apparatus. If, for example, the second apparatus is wirelessly connected to the network, it may be disconnected from the network unintentionally in this mode. Furthermore, even if the second apparatus is connected to the network via a wire, it may be disconnected from the network due to a contact failure of a connector or various factors. In this case, when the second apparatus is connected to the network again, the second apparatus operates in the non-discoverable mode, and thus the first apparatus cannot discover the second apparatus. Note that in response to disconnection of connection to the network, the second apparatus may end the non-discoverable mode to transit to a discoverable mode. In this case, although the first apparatus can discover the second apparatus, the second apparatus unwantedly responds to a search signal by an apparatus different from the first apparatus. Therefore, in consideration of this situation, there is a demand for a mechanism in which the second apparatus is discovered by the first apparatus but is not discovered by another apparatus at the time of reconnection after disconnection of connection to the network. On the other hand, the second apparatus may be preferably discovered by apparatuses as many as possible at the time of reconnection after connection to the network is disconnected due to control of the first apparatus.

Therefore, in this embodiment, if a communication apparatus (camera) operating in a mode in which the apparatus does not respond to a search signal by another apparatus is disconnected from the network, an operation when the apparatus is reconnected to the network is set in accordance with a situation at the time of the disconnection. For example, in a situation in which disconnection of the communication apparatus from the network is unintentional on the side of the communication partner apparatus before the disconnection, when the communication apparatus is reconnected to the network, it transmits, by unicast, a signal indicating the reconnection to the communication partner apparatus at the time of the disconnection. In this case, the communication apparatus does not respond to a search signal from an apparatus except for the communication partner apparatus at the time of the disconnection. This can prevent the communication apparatus from being discovered from an apparatus except for the communication partner apparatus at the time of the disconnection, thereby suppressing unnecessary signal transmission/reception. On the other hand, if the disconnection is performed by the intention of the communication partner apparatus, and the network connection is disconnected due to control of the communication partner apparatus, when the communication apparatus is reconnected to the network, it can transmit, by multicast or broadcast, a signal indicating the reconnection. In this case, the communication apparatus can respond to a search signal from an arbitrary apparatus. This allows the communication apparatus to communicate with another apparatus when, for example, the communication partner apparatus executes processing for ending communication.

The arrangement of the apparatus that executes such processing and an example of the procedure of the processing to be executed will be described below.

(System Arrangement)

FIG. 1 shows an example of a system arrangement according to this embodiment. This system includes a camera 101 and a client apparatus 102. The camera 101 and the client apparatus 102 include communication apparatuses that can be connected to each other via a network 103 and can communicate with each other. Note that FIG. 1 shows, as an example, a system including one camera 101 and one client apparatus 102. The present invention, however, is not limited to this. For example, a plurality of cameras 101 and a plurality of client apparatuses 102 may exist, and these apparatuses may be connected to each other via the network 103. An apparatus except for the camera 101 and the client apparatus 102 can be connected to the network 103.

The camera 101 is, for example, a network camera, and can be configured to execute image capturing processing in accordance with an instruction from another apparatus via the network 103, and transmit information of an image obtained by image capturing to the other apparatus. The client apparatus 102 is, for example, a computer such as a general-purpose personal computer or a server, and is configured to execute various processes by causing a processor such as a CPU to execute various programs stored in a storage device such as a memory or a hard disk. For example, by executing a program for controlling the network camera, the client apparatus 102 can transmit, via the network 103, a control signal to control the camera 101, and receive a captured image provided from the camera 101. Furthermore, the client apparatus 102 can execute a program for displaying the provided captured image on a display. Note that the camera 101 may perform image capturing within a preset image capturing range, and provide an image capturing result to the client apparatus 102. That is, the client apparatus 102 need not always control the camera 101, and may be configured to receive a captured image from the camera 101 and transmit an acknowledgement, as needed.

The network 103 is a wireless or wired communication network that is formed by one or more routers, switches, cables, and the like all of which operate in accordance with a communication standard such as Ethernet®. The present invention, however, is not limited to this. That is, the network 103 may be a communication network of an arbitrary communication standard, scale, and arrangement as long as it is possible to establish connection between the camera 101 and the client apparatus 102 and execute communication between these apparatuses.

Each of the camera 101 and the client apparatus 102 transmits/receives a discovery packet to grasp other apparatuses in a state in which they are connected to the network 103 and can be connected to the side apparatus. A protocol that transmits/receives the discovery packet can be, for example, WS-Discovery (Web Service Dynamic Discovery). If WS-Discovery is used, when the camera 101 is connected to the network 103, it transmits, to other apparatuses currently connected to the network 103, a Hello packet for making a notification that the side apparatus is connected to the network 103. By receiving this Hello packet, the client apparatus 102 can recognize that the camera 101 has joined the network 103. The client apparatus 102 transmits a Probe packet for searching for an apparatus that has a desired function or provides a desired service among the apparatuses connected to the network 103. In this example, the client apparatus 102 transmits a Probe packet for searching for a camera as an apparatus having an image capturing function. If the camera 101 is an apparatus that has a function desired by the client apparatus 102 or provides a service desired by the client apparatus 102, upon receiving the Probe packet, the camera 101 transmits a ProbeMatch packet to the client apparatus 102. Thus, the client apparatus 102 can recognize the camera 101 connected to the network 103, communicate with the camera 101, and transmit each control command for PTZ (Pan/Tilt/Zoom) control or the like to the camera 101. In this case, the camera 101 can also transmit, to the client apparatus 102, a response to the command.

(Apparatus Arrangement)

Figure 2:
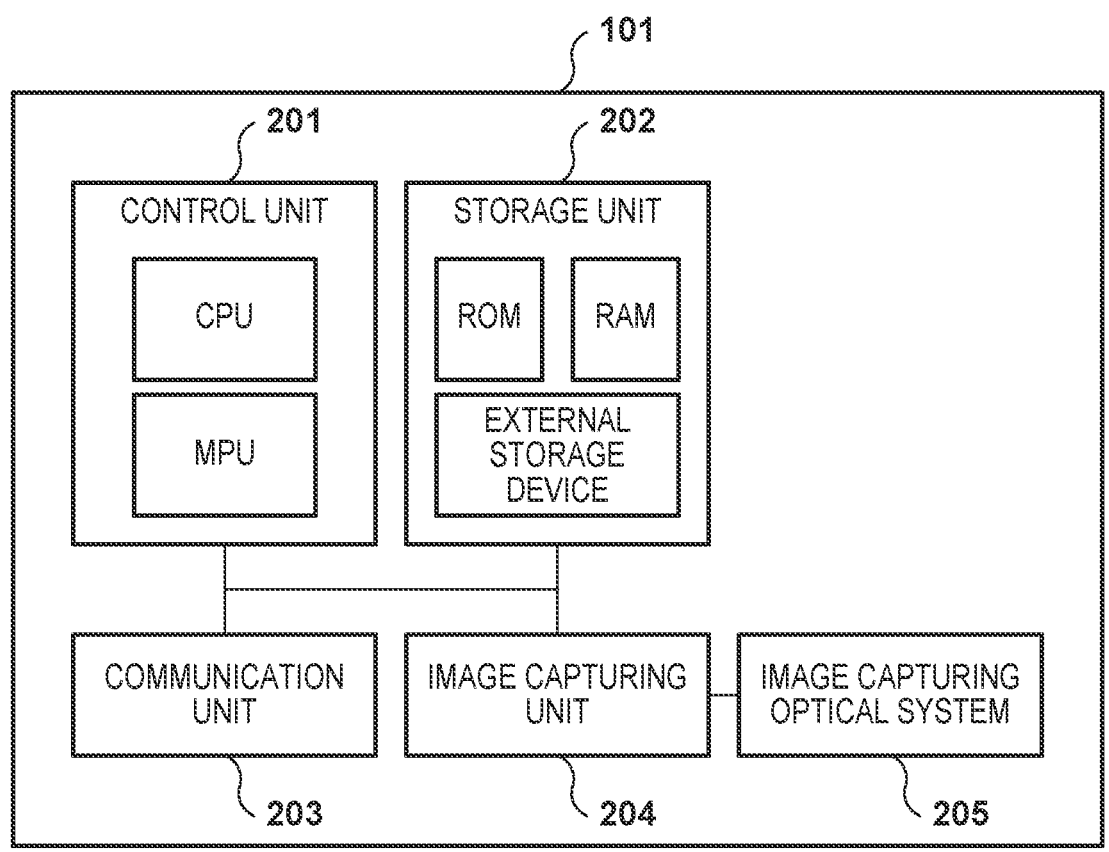
FIG. 2 is a block diagram showing an example of the apparatus arrangement of a camera.

Examples of the apparatus arrangements of the camera 101 and the client apparatus 102 will be described. The example of the apparatus arrangement of the camera 101 will be described first with reference to FIG. 2. In an example, the camera 101 includes a control unit 201, a storage unit 202, a communication unit 203, an image capturing unit 204, and an image capturing optical system 205. Note that the arrangement shown in FIG. 2 is merely an example. Part of the arrangement shown in FIG. 2 may be omitted, or an additional component may be added to the arrangement shown in FIG. 2. A plurality of functional blocks shown in FIG. 2 may be integrated into one functional block, and one functional block shown in FIG. 2 may be divided into a plurality of functional blocks. Part or all of the arrangement shown in FIG. 2 may be replaced by another component. For example, the camera 101 can have various arrangements such as an arrangement in which a video analysis function, a voice input function, a voice output function, and the like are further included, and an arrangement in which the control unit 201 has part of the capability of the storage unit 202.

The control unit 201 performs overall control of the camera 101 and various processes by, for example, executing a program stored in the storage unit 202. In an example, the control unit 201 includes one or more processors such as a CPU and an MPU. Note that the control unit 201 may perform overall control of the camera 101 and various processes by another arbitrary processor such as a logic circuit implemented by an ASIC (Application Specific Integrated Circuit) or FPGA (Field Programmable Gate Array). The storage unit 202, for example, stores a program to be executed by the control unit 201, and provides a work area used by the control unit 201 during execution of the program. The storage unit 202 stores various kinds of information, for example, stores or temporarily saves setting values such as network connection settings, information about the connected client apparatus 102, and image data generated by the image capturing unit 204 (to be described later). Note that the storage unit 202 includes, for example, memories such as a ROM (Read Only Memory) and a RAM (Random Access Memory), and an external storage device such as a hard disk drive.

The communication unit 203 communicates with another apparatus such as the client apparatus 102 via the network 103. For example, the communication unit 203 receives a change or control command of each setting value from the client apparatus 102, and transmits various kinds of data such as a response to each command and image data stored in the storage unit 202 to the client apparatus 102. The communication unit 203 can transmit/receive a discovery packet in correspondence with, for example, WS Discovery. The control unit 201 acquires a command from the client apparatus 102 via the communication unit 203, and controls the camera 101. The communication unit 203 includes, for example, a modulation and demodulation circuit and interface for wired communication or wireless communication.

The image capturing unit 204 converts, into digital data, an analog signal obtained by image capturing, and outputs the digital data as a captured image to the storage unit 202. The image capturing optical system 205 is a general optical system including a lens, and is configured to form an optical image of an object on an imaging element. The image capturing unit 204 acquires an analog signal of the captured image by receiving, by the imaging element, the image of the object formed by the image capturing optical system 205. Note that the control unit 201 can be configured to recognize, by monitoring the storage unit 202 or a notification from the image capturing unit 204, that the captured image is stored in the storage unit 202, and control the communication unit 203 to transmit the stored captured image to the client apparatus 102.

Figure 3:
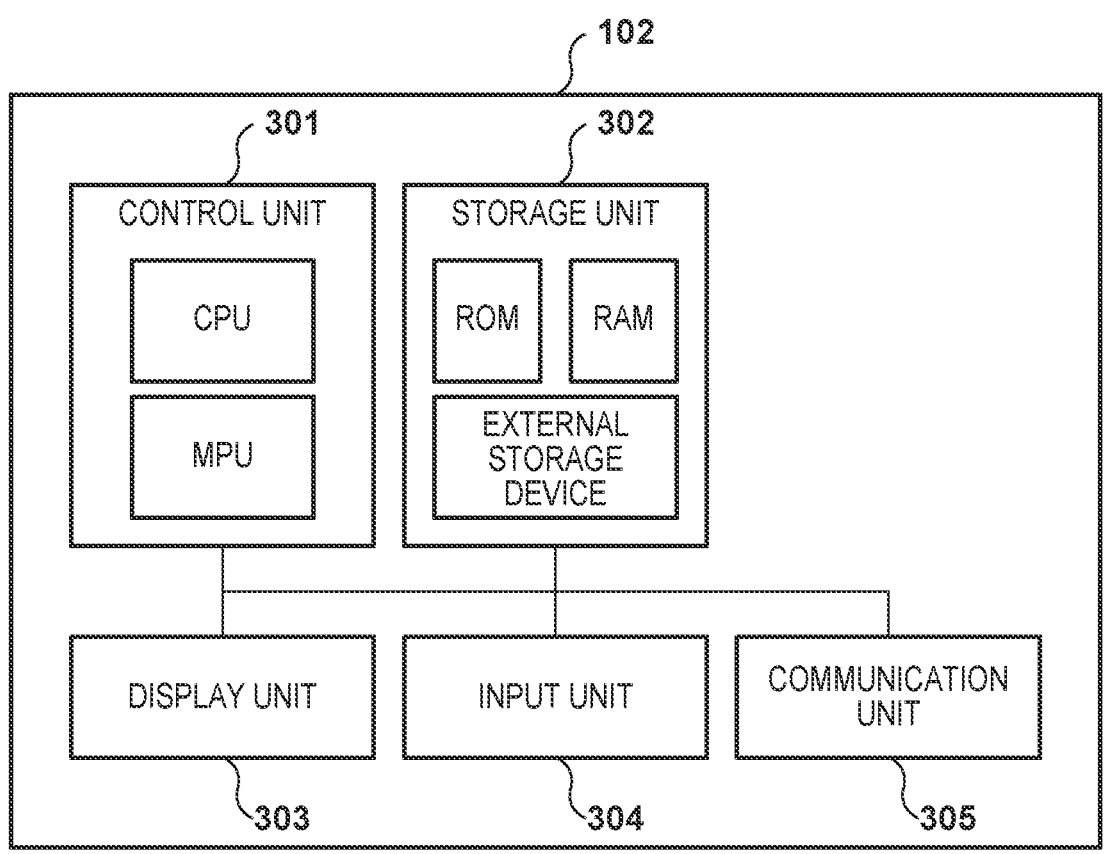
FIG. 3 is a block diagram showing an example of the apparatus arrangement of a client apparatus.

The example of the apparatus arrangement of the client apparatus 102 will be described next with reference to FIG. 3. In an example, the client apparatus 102 includes a control unit 301, a storage unit 302, a display unit 303, an input unit 304, and a communication unit 305. Note that the arrangement shown in FIG. 3 is merely an example. Part of the arrangement shown in FIG. 3 may be omitted, or an additional component may be added to the arrangement shown in FIG. 3. A plurality of functional blocks shown in FIG. 3 may be integrated into one functional block, and one functional block shown in FIG. 3 may be divided into a plurality of functional blocks. Part or all of the arrangement shown in FIG. 3 may be replaced by another component. For example, the client apparatus 102 can have various arrangements such as an arrangement in which an image analysis processing function, a video accumulation function, and the like are further included, and an arrangement in which the control unit 301 has part of the capability of the storage unit 302.

The control unit 301 performs overall control of the client apparatus 102 and various processes by, for example, executing a program stored in the storage unit 302. In an example, the control unit 301 includes one or more processors such as a CPU and an MPU. Note that the control unit 301 may perform overall control of the client apparatus 102 and various processes by another arbitrary processor such as a logic circuit implemented by an ASIC (Application Specific Integrated Circuit) or FPGA (Field Programmable Gate Array). The storage unit 302, for example, stores a program to be executed by the control unit 301, and provides a work area used by the control unit 301 during execution of the program. The storage unit 302 stores various kinds of data such as information of a connectable camera existing on the network 103. Note that the storage unit 302 includes memories such as a ROM (Read Only Memory) and a RAM (Random Access Memory), and an external storage device such as a hard disk drive. The display unit 303 has a screen display function such as an LCD (Liquid Crystal Display) or an organic EL display, and various functions of visually presenting information by a light-emitting pattern of an LED (Light Emitting Diode) or the like. In addition, the display unit 303 may include a device that presents information by speech/sound. The client apparatus 102 can at least visually present, to the user of the side apparatus via the display unit 303, various kinds of information such as a setting screen for data acquisition and display, a video received from the camera 101, and various messages. Furthermore, the client apparatus 102 may have, for example, a display control function of displaying an image on an external display. In this case, the display unit 303 need not have the screen display function. In addition, the client apparatus 102 may only accumulate a video received from the camera 101, and need not execute processing associated with video display. However, in this case as well, the display unit 303 can be used to present the state of the client apparatus 102 and the like to be confirmable. The input unit 304 includes, for example, operation acceptance devices such as buttons, a four-way selector, a touch panel, and a mouse, and converts contents of a user operation into an electrical signal to notify the control unit 301 of it. The communication unit 305 communicates with another apparatus such as the camera 101 via the network 103. For example, the communication unit 305 performs various communications such as transmission of each change command including a network setting change to the camera 101, and reception of a video stream or a response to each change command from the camera 101. The communication unit 305 can transmit/receive a discovery packet in correspondence with, for example, WS Discovery. The communication unit 305 includes, for example, a modulation and demodulation circuit and interface for wired or wireless communication.

(Procedure of Processing)

Figure 4:
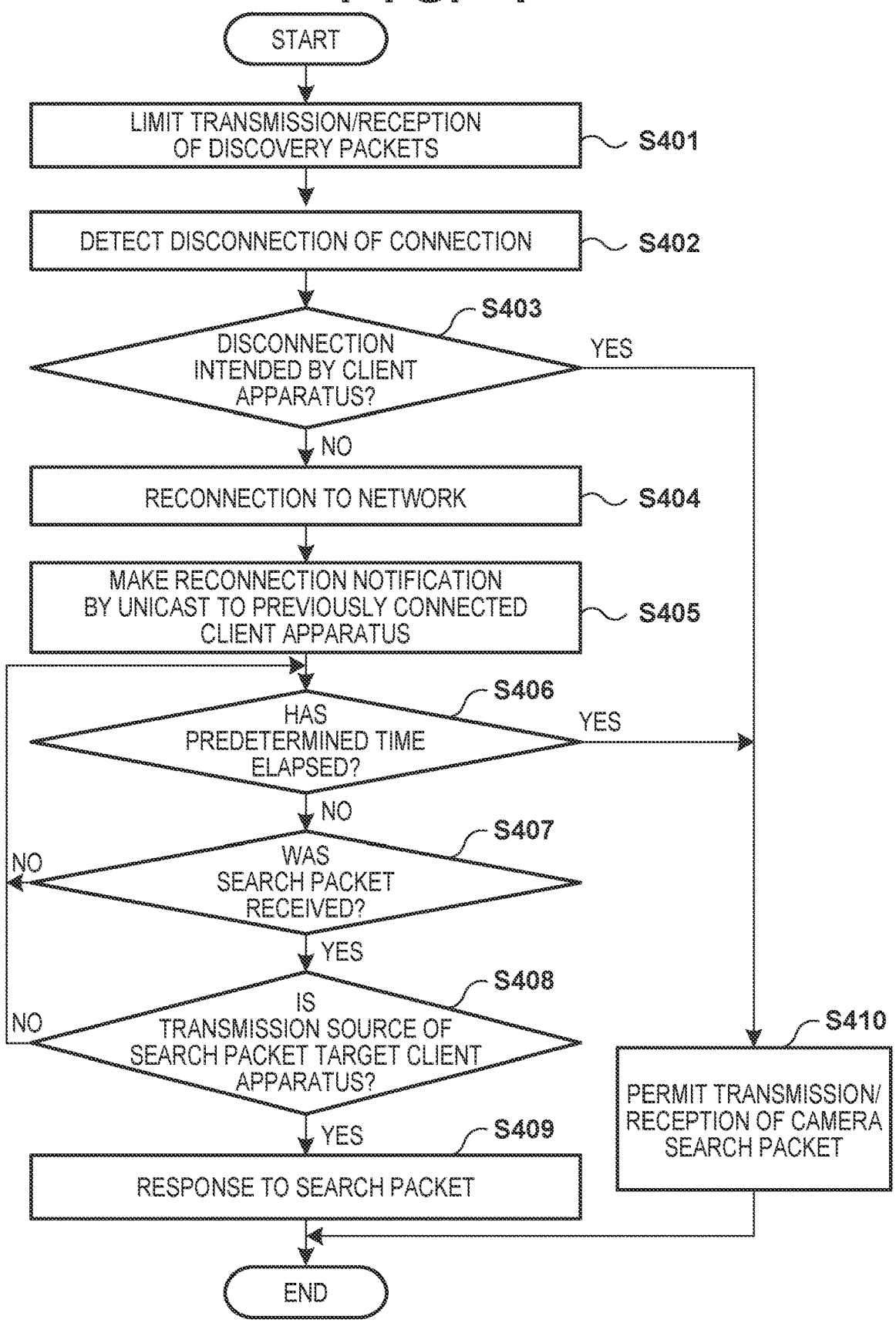
FIG. 4 is a flowchart illustrating the first example of the procedure of processing executed by the camera.

An example of the procedure of processing executed by the camera 101 according to this embodiment will be described with reference to FIG. 4. Particularly, processing for causing another apparatus to discover the camera 101 will be described below. Note that the processing to be described below is implemented when, for example, the control unit 201 of the camera 101 controls the communication unit 203 by executing a program stored in the storage unit 202. Note that a processor (not shown) in the communication unit 203 may execute the following processing regardless of control of the control unit 201.

The camera 101 limits discovery packet transmission/reception in response to a transmission/reception limiting request received from the client apparatus 102 via the communication unit 203 (step S401). At this time, in response to a user input accepted by the input unit 304, the client apparatus 102 can transmit a signal to request the camera 101 to limit discovery packet transmission/reception. Note that the camera 101 may limit discovery packet transmission/reception in response to establishment of connection to the client apparatus 102. In an example, limitation of discovery packet transmission/reception corresponds to a stop of part or all of discovery packet transmission/reception. The present invention, however, is not limited to this. For example, discovery packet transmission/reception may be limited by a form except for a stop of packet transmission/reception, such as limitation of the range of the destination of a packet to be transmitted.

Figure 5:
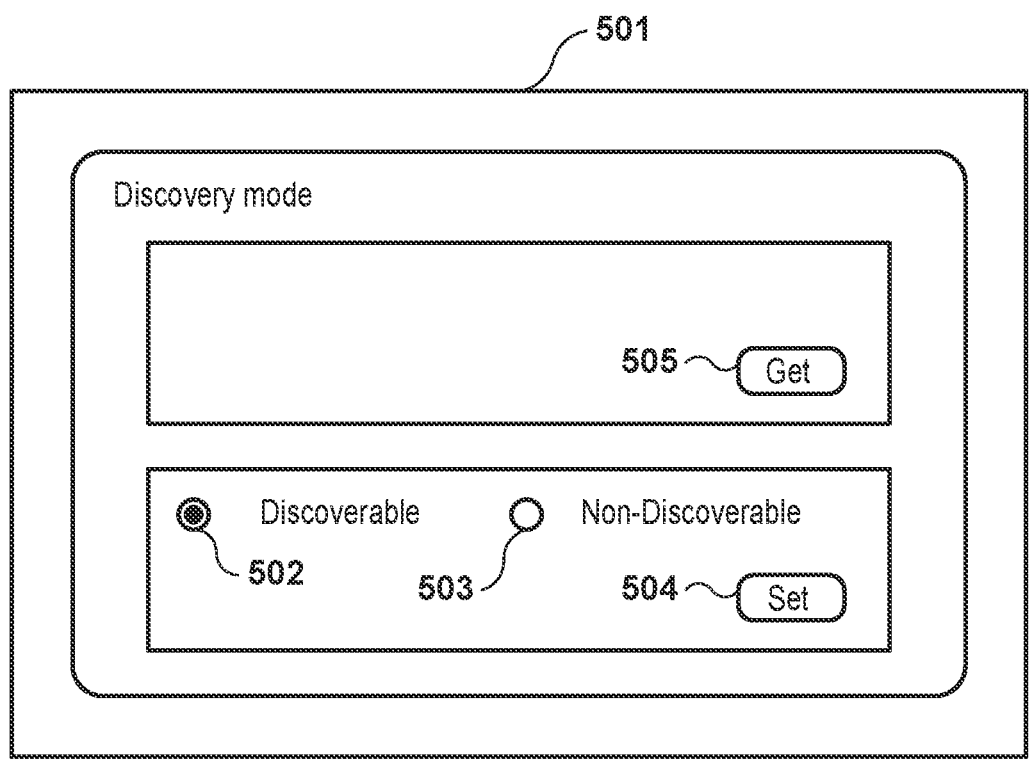
FIG. 5 is a view showing an example of display of a screen for accepting a user operation associated with limitation of discovery packet transmission/reception.

An example of display of a screen for accepting a user input, which is displayed on the client apparatus 102 to transmit a control command associated with the presence/absence of limitation of discovery packet transmission/reception, will be described with reference to FIG. 5. The client apparatus 102 displays a window 501 for providing a graphical user interface (GUI) operable by an input of the input unit 304 in order to accept a user operation associated with discovery packet transmission/reception. The user of the client apparatus 102 makes a selection by pressing one of a radio button 502 for permitting discovery packet transmission/reception and a radio button 503 for not permitting discovery packet transmission/reception, both of which are prepared on the window 501. After that, when the user presses a setting value change button 504, the client apparatus 102 transmits a request to permit or stop discovery packet transmission/reception to the camera 101 in accordance with the selection result of the radio buttons 502 and 503. In response to this request, the camera 101 changes the setting of discovery packet transmission/reception (if possible). Note that if the setting is changed, the camera 101 may notify the client apparatus 102 of completion of the change of the setting. Furthermore, a setting value acquisition button 505 may be provided in the window 501. If the user presses the setting value acquisition button 505, the client apparatus 102 may acquire the current setting information about discovery packet transmission/reception from the camera 101, and notify the user of the current setting information. For example, the user can be notified of the current setting information by performing display so as to set a state in which, among the radio buttons 502 and 503, the radio button corresponding to the current setting information is selected.

Referring back to FIG. 4, in step S402, the camera 101 detects disconnection of connection to the network 103 (disconnection of connection to the client apparatus 102). If, for example, it is impossible to transmit a video to a distribution destination during distribution of the video or it is impossible to transmit a response to a control command received from the client apparatus 102, the camera 101 detects disconnection of connection to the network. As a protocol for making a notification of the state of the network, for example, ICMP (Internet Control Message Protocol) is used.

After that, the camera 101 determines whether the disconnection is disconnection caused by control of the camera 101 by the client apparatus 102 (by the intention of the client apparatus 102) (step S403). For example, the client apparatus 102 may transmit, to the camera 101, a setting change request about network connection, such as an IP address or a network interface to be used, to change the setting, thereby disconnecting the network. Such disconnection is determined to be caused by control of the camera 101 by the client apparatus 102. Furthermore, for example, if the camera 101 transmits a signal to the client apparatus 102 but it cannot be determined that transmission of the signal has succeeded, it can be determined that disconnection which is not caused by control by the client apparatus 102 occurs. If it is determined that the disconnection of the network is disconnection caused by control of the camera 101 by the client apparatus 102 (YES in step S403), the camera 101 advances the process to step S410. On the other hand, if it is determined that the disconnection is unintentional for the client apparatus 102 (NO in step S403), the camera 101 advances the process to step S404.

In step S404, the camera 101 performs reconnection to the network. The camera 101 determines a connection status to the network 103 by, for example, ICMP described above, and requests a device forming the network 103 to perform reconnection to the network, as needed. After that, the camera 101 transmits, by unicast, to the client apparatus 102 with which communication is performed at the time of disconnection, a packet for making a notification that the camera 101 is reconnected to the network 103 (step S405). That is, since discovery packet transmission/reception is limited by the processing in step S401, the camera 101 transmits, by unicast, a packet such as a Hello packet for making a notification of reconnection, to the client apparatus 102 to which connection was previously established, as a destination. At this time, since no packet for making a notification of reconnection is transmitted to another apparatus, the other apparatus does not recognize that the camera 101 has been connected to the network 103. Note that if, after step S405, a reconnection request is received or a control command or the like is received from the previously connected client apparatus 102, the camera 101 determines that the client apparatus 102 has recognized the existence of the side apparatus, and may skip succeeding processing.

The camera 101 determines whether a predetermined time has elapsed since reconnection to the network without receiving a packet or command from the previously connected client apparatus 102 (step S406). If the predetermined time has elapsed since reconnection to the network without receiving a command or packet from the client apparatus 102 (YES in step S406), the camera 101 advances the process to step S410. On the other hand, if the predetermined time has not elapsed since reconnection to the network (NO in step S406), the camera 101 determines whether a search packet such as the above-described Probe packet has been received (step S407). Note that after reconnection to the network in step S405, the camera 101 stands by for reception of a search packet until a packet or command is received from the client apparatus 102 or the predetermined time elapses to advance the process to step S410. Upon receiving a search packet (YES in step S407), the camera 101 determines whether the received search packet is received from the previously connected client apparatus 102 (step S408). For example, the camera 101 stores the IP address of the previously connected client apparatus, a UUID (Universally Unique Identifier) as an identifier unique to a device, or the like, and compares it with information included in the packet. Note that it may be determined by another method whether the previously connected client apparatus is the transmission source apparatus of the packet. If it is determined that the received search packet is received from the previously connected client apparatus 102 (YES in step S408), the camera 101 transmits, to the client apparatus 102, a packet indicating a response to a search, such as a ProbeMatch packet (step S409). Note that if no search packet is received (NO in step S407) or the transmission source of the search packet is not the previously connected client apparatus 102 (NO in step S408), the camera 101 repeats the processes in steps S407 and S408 until the predetermined time elapses.

In step S410, the camera 101 removes the limitation of discovery packet transmission/reception set in step S401. If it is determined in step S403 that the network is disconnected by the intention of the client apparatus 102, or the predetermined time elapses in step S406 without receiving a packet from the previously connected client apparatus 102, this processing is executed. In this case, even if the network setting of the client apparatus 102 has been changed, when the camera 101 removes the limitation of discovery packet transmission/reception, connection to the client apparatus 102 can be accepted. If connection to the network 103 is disconnected by the intention of the client apparatus 102, the camera 101 can permit connection from another client apparatus by removing the limitation of discovery packet transmission/reception.

As described above, if the network connection is disconnected while discovery packet transmission/reception is limited, the camera 101 determines whether the disconnection has been performed by the intention of the client apparatus 102. If the disconnection has not been performed by the intention of the client apparatus 102, the camera 101 transmits a discovery packet to the client apparatus 102 connected at the time of the disconnection without removing the limitation of discovery packet transmission/reception. This allows the camera 101 to transmit/receive packets to/from the client apparatus 102, to which connection was established immediately before the disconnection, while maintaining the limitation of discovery packet transmission/reception between the side apparatus and another client. Note that "maintaining" indicates that exactly the same limitation as before the disconnection need not be maintained and at least a state in which some limitation is imposed on discovery packet transmission/reception is maintained.

Note that if the camera 101 receives, from the client apparatus 102, a command to control the side apparatus, the camera 101 needs to be reactivated depending on the received control command in some cases. In this case, after the reactivation processing, the camera 101 is reconnected to the network 103. In this case, the same processing as that performed when disconnection is performed by the intention of the client apparatus 102 is executed. This allows the camera 101 to transmit/receive packets to/from the client apparatus 102, to which connection was established before the disconnection, while maintaining the limitation of discovery packet transmission/reception between the side apparatus and another client after the reactivation processing. FIG. 6 illustrates the procedure of the processing in this case. Note that processing steps common to the processing shown in FIG. 6 and that shown in FIG. 4 are denoted by the same reference symbols and a description thereof will be omitted.

In step S601, if the camera 101 receives, from the client apparatus 102, a command to control the side apparatus, it is determined whether the camera 101 needs to be reactivated in accordance with the received control command. For example, the camera 101 can be reactivated when updating parameters in response to a parameter change request from the client apparatus 102. If the camera 101 needs to be reactivated in accordance with the control command from the client apparatus 102 (YES in step S601), the camera 101 advances the process to step S602; otherwise (NO in step S601), the camera 101 executes control in accordance with the received control command, and does not perform processing associated with limitation of discovery packet transmission/reception.

In step S602, the camera 101 reactivates the side apparatus. This reactivation processing completes, for example, parameter update requested from the client apparatus 102 in step S601 or the like. Note that along with this reactivation processing, connection between the camera 101 and the network 103 is disconnected. Then, the camera 101 is reconnected to the network (step S404). For example, after the end of the reactivation processing, the camera 101 transmits, to a device forming the network 103, a reconnection request signal to the network.

As described above, if the camera 101 receives, from the client apparatus 102, the control command along with reactivation in a state in which discovery packet transmission/reception is limited, the camera 101 does not remove the limitation of discovery packet transmission/reception. Then, the camera 101 transmits a discovery packet to only the client apparatus 102 connected at the time of reactivation. This allows the camera 101 to, if the camera 101 is disconnected from the network 103 due to reactivation performed by a request of the client apparatus 102, transmit/receive packets to/from the client apparatus 102 while maintaining the limitation of discovery packet transmission/reception.

Note that the camera 101 may transmit only one of a packet for making a notification of reconnection to the network in step S405 and a packet for responding to a search in step S409, or continue the limitation of discovery packet transmission/reception without performing processing in step S410. Furthermore, a transmission target may be limited for only one of a packet for making a notification of reconnection to the network in step S405 and a packet for responding to the search in step S409, and may not be limited for the other. Furthermore, for example, in step S410, the limitation may be relaxed. For example, only a predetermined partner (for example, an apparatus having an identifier within a predetermined range) is permitted to transmit/receive discovery packets. The processing shown in each of FIGS. 4 and 6 is merely an example, and various changes may be made.

Furthermore, the camera 101 can execute communication for allowing another apparatus connected to the network 103 to recognize the existence of the side apparatus, and can execute the above-described processing as long as the communication can be limited. That is, if connection of the camera 101 to the network 103 is disconnected due to a factor other than control of the camera 101 by the client apparatus 102 while the communication for allowing another apparatus to recognize the existence of the side apparatus is limited, the camera 101 can maintain the limitation. In addition, if connection of the camera 101 to the network 103 is disconnected due to control of the camera 101 by the client apparatus 102 while the limitation is imposed, the camera 101 can remove the limitation. The camera 101 is an example of an apparatus to which the client apparatus 102 is connected when the client apparatus 102 controls a network camera system such as monitoring system, and the present invention is not limited to this. That is, for example, an arbitrary apparatus capable of executing another service such as a printer and having a communication function may execute the above-described processing.

According to the present invention, if one of two or more apparatuses connected via the network is disconnected from the network unintentionally, it is possible to appropriately perform reconnection of the two or more apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-008167, filed Jan. 22, 2018 which is hereby incorporated by reference herein in its entirety.

What is claimed is:

1. A communication apparatus comprising:
a communication unit capable of executing, with an apparatus connecting to a network, communication related to transmission of a packet for discovery;
a control unit configured to, after the communication apparatus is connected to an external apparatus via the network, control the communication unit to limit the communication with another external apparatus connecting to the network; and
a determination unit configured to determine, in a case where the connection with the external apparatus is disconnected, whether the disconnection is performed by the external apparatus,
wherein, in a case where reconnection to the network is performed after the connection to the external apparatus is disconnected and where it is determined that the disconnection is not performed by the external apparatus, the communication unit is controlled by the control unit to maintain the limitation for the communication with the other external apparatus and to transmit a reconnection notification to the external apparatus by unicast, and
wherein, in a case where reconnection to the network is performed after connection to the external apparatus is disconnected and it is determined that the disconnection is performed by the external apparatus, the communication unit is controlled by the control unit to communicate with the other external apparatus without the limitation.

2. The communication apparatus according to claim 1, wherein if the connection is disconnected in accordance with a command received from the external apparatus via the communication unit, the control unit determines that the disconnection is performed by the external apparatus.

3. The communication apparatus according to claim 2, wherein the command includes a command of a setting change request to change a setting of connection of the communication apparatus to the network.

4. The communication apparatus according to claim 1, wherein if the communication apparatus is reactivated in accordance with a command received from the external apparatus via the communication unit, the control unit determines that the disconnection is performed by the external apparatus.

5. The communication apparatus according to claim 1, wherein if a signal is transmitted to the external apparatus but it cannot be determined that transmission of the signal has succeeded, the control unit determines that the disconnection is performed by the external apparatus.

6. The communication apparatus according to claim 1, wherein the communication related to transmission of the packet for discovery includes transmitting a signal indicating connection to the network when the communication apparatus is connected to the network.

7. The communication apparatus according to claim 1, wherein the communication related to transmission of the packet for discovery includes responding to a search signal from the apparatus connecting to the network, with which the communication apparatus executes the communication related to transmission of the packet for discovery.

8. The communication apparatus according to claim 7, wherein the limitation includes not responding to the search signal from the other external apparatus.

9. The communication apparatus according to claim 1, wherein the control unit controls the communication unit to limit the communication with the other external apparatus connecting to the network in response to reception of a signal to request the limitation from the external apparatus.

10. The communication apparatus according to claim 1, wherein the control unit controls the communication unit to limit the communication with the other external apparatus connecting to the network in response to establishment of connection to the external apparatus.

11. The communication apparatus according to claim 1, wherein the communication unit transmits an image to the external apparatus.

12. The communication apparatus according to claim 1, wherein the reconnection notification is a Hello packet.

13. An image capturing apparatus comprising:
an image capturing unit configured to capture an image;
a communication unit capable of executing, with an apparatus connecting to a network, communication related to transmission of a packet for discovery and communication for transmitting the image to a communication partner apparatus;
a control unit configured to, after the communication apparatus is connected to an external apparatus via the network, control the communication unit to limit the communication with another external apparatus connecting to the network; and
a determination unit configured to determine, in a case where the connection with the external apparatus is disconnected, whether the disconnection is performed by the external apparatus,
wherein, in a case where reconnection to the network is performed after the connection to the external apparatus is disconnected and where it is determined that the disconnection is not performed by the external apparatus, the communication unit is controlled by the control unit to maintain the limitation for the communication with the other external apparatus and to transmit a reconnection notification to the external apparatus by unicast, and
wherein, in a case where reconnection to the network is performed after connection to the external apparatus is disconnected and it is determined that the disconnection is performed by the external apparatus, the communication unit is controlled by the control unit to communicate with the other external apparatus without the limitation.

14. A control method for a communication apparatus that is capable of executing, with an apparatus connecting to a network, communication related to transmission of a packet for discovery and can control, after the communication apparatus is connected to an external apparatus via the network, the communication apparatus to limit the communication with another external apparatus connecting to the network, the method comprising:
determining, in a case where the connection with the external apparatus is disconnected, whether the disconnection is performed by the external apparatus;

in a case where reconnection to the network is performed after the connection to the external apparatus is disconnected and where it is determined that the disconnection is not performed by the external apparatus,
controlling the communication apparatus to maintain the limitation for the communication with the other external apparatus, and
controlling the communication apparatus to transmit a reconnection notification to the external apparatus by unicast, and
in a case where reconnection to the network is performed after connection to the external apparatus is disconnected and it is determined that the disconnection is performed by the external apparatus, controlling the communication apparatus to communicate with the other external apparatus without the limitation.

15. A non-transitory computer-readable storage medium that stores a program for causing a computer, provided in a communication apparatus that is capable of executing, with an apparatus connecting to a network, communication related to transmission of a packet for discovery and can control, after the communication apparatus is connected to an external apparatus via the network, the communication apparatus to limit the communication with another external apparatus connecting to the network, to:
determine, in a case where the connection with the external apparatus is disconnected, whether the disconnection is performed by the external apparatus;
in a case where reconnection to the network is performed after the connection to the external apparatus is disconnected and where it is determined that the disconnection is not performed by the external apparatus,
control the communication apparatus to maintain the limitation for the communication with the other external apparatus, and
control the communication apparatus to transmit a reconnection notification to the external apparatus by unicast, and
in a case where reconnection to the network is performed after connection to the external apparatus is disconnected and it is determined that the disconnection is performed by the external apparatus, control the communication apparatus to communicate with the other external apparatus without the limitation.

* * * * *